JOHN HASKINS.
*Perforated Sheet-rubber, Rubber & Cloth etc.*
4259
REISSUED FEB 14 1871
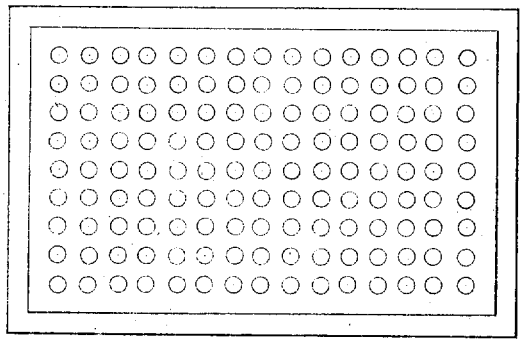
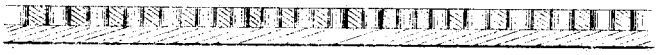
*Witnesses:*
C. F. Brown
Peter Ward
*Inventor.*
John Haskins
by his atty.
Carroll D. Wright

United States Patent Office.

JOHN HASKINS, OF BOSTON, MASSACHUSETTS.

Letters Patent No. 67,298, dated July 30, 1867; reissue No. 3,100, dated August 25, 1868, reissue No. 4,259, dated February 14, 1871.

IMPROVEMENT IN PERFORATED SHEET-RUBBER.

The Schedule referred to in these Letters Patent and making part of the same.

*To all to whom these presents may come:*

Be it known that I, JOHN HASKINS, of Boston, county of Suffolk and State of Massachusetts, have invented certain new and useful Improvements in Perforated Sheet-Rubber, Rubber, and Cloth; and I do hereby declare that the following is a full, clear, and exact description thereof, reference being had to the annexed drawing making part of this specification Figure 1 represents a piece of India-rubber sheet, which is provided with a great many small perforations at regular distances.

Figure 2 is a sectional view, showing the perforated rubber-sheet attached to cloth.

The perforations shown in all the figures will be made more or less minute, according to the nature of the use to which the sheet-rubber will be put, and the rubber-sheets will vary in thickness according to the use for which it may be designed.

I propose using India-rubber sheets of any desired thickness, which shall be provided with perforations, as described, as an outer covering or coating for silk, cotton, woolen, or other cloth, or any material which will answer the purpose for any article of wearing apparel, as well as independent of any cloth base.

I may cover a great variety of fabrics with this perforated rubber goods, and I can use such fabrics for almost every article of ladies' or gentlemen's wear.

Boots and shoes can be made of this material, and the natural perspiration from the body will readily be carried off through the perforations or pores of the rubber-sheets.

These rubber-sheets can also be used without any cloth lining, as for gorings to boots and shoes.

These perforated sheets of rubber have the appearance of finely-perforated paper, and they are water-tight; although in holding the rubber up to the light the perforations are distinct, and yet perspiration or any gases will pass through. This makes the invention valuable when using rubber goods for any article of clothing and for boots and shoes, and for gorings to boots and shoes.

Water can be forced through my perforated rubber, but it will not pass through unless subjected to pressure.

Another valuable consideration regarding the use of my perforated rubber is that boots and shoes made of cloth covered with it can be made to fit the foot much neater, while the boots or shoes will be more durable and easy upon the foot.

It will be seen from the above that I wish it understood that I do not propose to confine myself to any particular class of articles to which my invention may be applied. Instead of rubber I may use gutta-percha, gum-valata, or valata, or shellac and rubber, or any other elastic gum.

Having thus fully described my invention,

What I claim as new, and desire to secure by Letters Patent, is—

The article of perforated rubber-sheets as a new article of manufacture, the same being used as and for the purpose set forth and described.

In testimony whereof I have signed my name to this specification in the presence of two subscribing witnesses.

JOHN HASKINS.

Witnesses:

CARROLL D. WRIGHT,
CHARLES F. BROWN.